May 31, 1932. J. DYKSTRA 1,861,053
CUSHION SHACKLE
Filed May 29, 1929
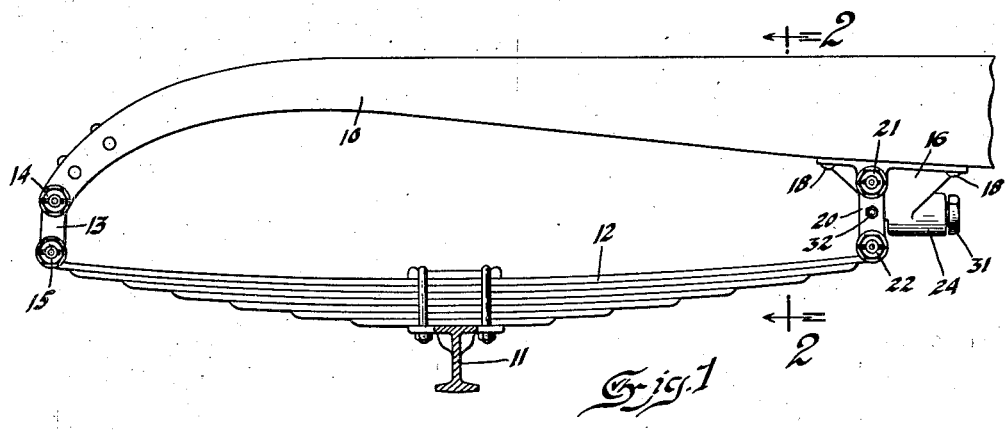
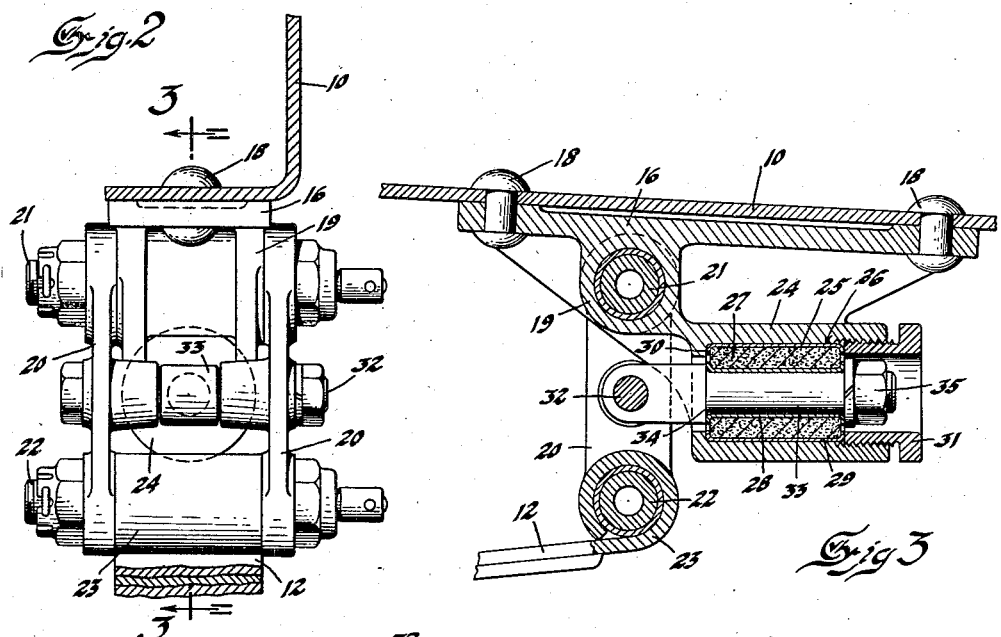
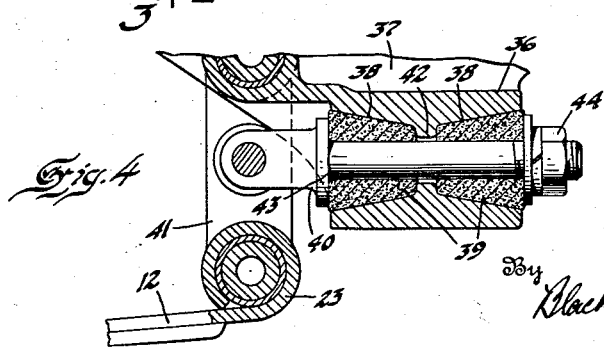
Inventor
James Dykstra
By Blackmore, Spencer & Hirsh
Attorneys Patented May 31, 1932

1,861,053

UNITED STATES PATENT OFFICE

JAMES DYKSTRA, OF LANSING, MICHIGAN, ASSIGNOR TO GENERAL MOTORS CORPORATION, OF DETROIT, MICHIGAN, A CORPORATION OF DELAWARE

CUSHION SHACKLE

Application filed May 29, 1929. Serial No. 366,966.

In a well constructed automotive vehicle, which is provided with semi-elliptic front load-carrying leaf springs which are connected at their front ends to the side members of the chassis frame by pivot bolts and at their rear ends to the side members of the chassis frame by shackles, steering wheel kick results principally from three causes, viz., front wheel tramp, front wheel shimmy, and the movement of the road wheel which is carried by the steering knuckle which carries the steering arm when it encounters a bump in the road. Front wheel tramp and front wheel shimmy in themselves, without regard to their effect on steering, are highly objectionable.

Steering wheel kick, which results from the causes mentioned above, front wheel tramp, and front wheel shimmy, can be greatly reduced, if not entirely eliminated, by connecting the front end of the front spring on the side of the vehicle on which the steering arm is provided on the steering knuckle to the chassis frame by means which allows a limited amount of resiliently opposed movement of the spring and the adjacent end of the front axle longitudinally of the spring. It is, however, preferable to shackle the front springs at their front instead of their rear ends, and to secure the rear end of the spring on the side of the vehicle on which the steering arm is provided on the steering knuckle to the chassis frame by means which allows a limited amount of resiliently opposed movement of the spring and the adjacent end of the front axle longitudinally of the spring.

My invention relates, generally, to devices for connecting an end of a leaf spring to a supporting or a supported member so as to allow a limited amount of resiliently opposed movement of the spring longitudinally of itself, and, particularly, to such a device which is peculiarly adapted for use in connecting an end of the front spring, which is located on the side of the vehicle on which the steering arm is provided on the steering knuckle, to the chassis frame so as to eliminate steering wheel kick, front wheel tramp and front wheel shimmy.

The invention resides in the provision of a device of the class described, which includes a bracket adapted to be connected to the chassis frame of a vehicle and a shackle pivoted at one end to the bracket and adapted to be pivotally connected at its opposite end to a load-carrying leaf spring and a link connected to an intermediate portion of the shackle and to the bracket in such a manner as to resiliently oppose pivotal movement of the link about its connection to the bracket.

For a better understanding of the nature and the objects of the present invention, reference is made to the following specification in which are described the preferred embodiments of my invention which are illustrated in the accompanying drawings.

In the drawings:

Figure 1 is a view showing, in side elevation, the front end of the side member on the steering side of the chassis frame, and the associated load-carrying spring of an automotive vehicle.

Figure 2 is an enlarged view taken as indicated by the line 2—2 of Figure 1.

Figure 3 is a section taken on substantially the line 3—3 of Figure 2.

Figure 4 is a section taken longitudinally through a slightly modified form of a device in which is embodied my invention.

In the drawings, the reference character 10 indicates the chassis frame of an automotive vehicle, which is adapted to be supported at its front end from the ground wheels through an axle 11 and semi-elliptic leaf springs 12 rigidly connected at their mid points to the axle. At their front end, the springs 12 are connected to the front ends of the side members of the chassis frame through shackles 13, which are pivoted to the frame at 14 and to the spring at 15.

To connect the rear end of the spring on the steering side of the vehicle to the adjacent side member of the chassis frame, there is provided a bracket 16 which is secured to the chassis frame by rivets 18 and on which is formed a depending lug 19. Through the upper extremities of a pair of shackle links 20, of which one is positioned on each side of the lug 19, and through the lug 19 extends a bolt 21 which pivotally connects the shackle to the bracket. The shackle is connected at its lower end to the rear end of the leaf spring 12 by a pivot bolt 22 which extends through the lower extremities of the links 20 and through the eye 23 of the spring.

For resiliently opposing movement of the spring 12 longitudinally of itself, there is provided on the bracket 16, a portion 24 in which is provided a substantially cylindrical opening 25. A resilient unit 26, which consists of a rubber bushing 27 encased in inner and outer steel sleeves 28 and 29 which are flanged at their ends so as to prevent the bushing moving bodily with respect to either but to allow the sleeves to move longitudinally with respect to each other when sufficient force is applied thereto to distort the bushing, is secured against longitudinal movement in the opening 25 by the flange 30 and the screw-threaded collar 31. Through intermediate portions of the shackle links 20 there extends a bolt 32 on which is pivoted, between the links, a rod 33 which extends through the resilient unit 26 and on which is provided a shoulder 34 and a nut 35 which bear against the opposite ends of the sleeve 28.

Vertical forces applied to the shackle 20 through the spring 12 will have no tendency to rock the shackle about its pivotal connection to the bracket 16, but when the spring is moved longitudinally of itself the shackle 20 will swing about its connection to the bracket. Since this pivotal movement of the shackle will cause the inner sleeve 25 to move longitudinally with respect to the outer sleeve, and since such relative movement will cause distortion of the initially loaded or compressed rubber bushing 24, the pivotal movement of the shackle will be resiliently opposed, the movement of the spring longitudinally of itself will be resiliently cushioned, and steering wheel kick, front wheel tramp and front wheel shimmy will be eliminated.

The modified form of the invention which is illustrated in Figure 4 of the drawing differs from that shown in the preceding figures only in that there is provided in the portion 36 of the bracket 37, instead of a cylindrical bore, two axially aligned, oppositely disposed frusto-conical recesses 38, in each of which is located a frusto-conical rubber bushing 39. The rod 40 which is connected at one end to an intermediate portion of the shackle 41 extends through the bushings 39 and the connecting bore 42. On the rod adjacent the end which is pivotally connected to the shackle, there is provided a shoulder 43 which bears against the outer end of one of the bushings 39 and on the opposite end of the rod there is threaded a nut 44 which bears against the outer end of the other bushing. By screwing in or out on the nut 44 the initial compression of, or load on, the bushings 39 and the rest position of the shackle 41 can be varied.

The manner in which the device shown in Figure 4 functions will be obvious from what has been said regarding the device shown in the preceding figures.

Although I have shown and described preferred embodiments of my invention, it is to be understood that this has been done merely by way of example and not by way of limitation, and that the scope of my invention is to be limited only by the appended claims.

I claim:

1. In a motor vehicle, a chassis frame, a load-supporting spring, and a driving connection between the spring and frame, including a bracket for attachment to the frame, a swinging link connection between the spring and bracket, a cylindrical casing secured to and formed integral with the bracket, concentric inner and outer sleeves positioned within said housing, a bushing of elastic deformable material interposed between said sleeves, means to secure the outer sleeve in the housing, and means to secure the inner sleeve to the link, whereby movement of the link is cushioned by the elastic deformable material between said sleeves.

2. In a motor vehicle having a swinging link connection between a load-supporting spring and a chassis frame, means to yieldably restrain movement of the link including a pair of spaced concentric members, elastic deformable material interposed between and fixed to both members, and means to hold immovable one of the members with respect to the link and the other with respect to the frame, whereby relative movement is cushioned by the flow of said elastic deformable material.

3. In a motor vehicle, a load-supporting spring, a swinging shackle for the spring, an attachment bracket for said shackle, having integral therewith an extension provided with an opening, elastic deformable material encased within said opening, and a connection between said material and shackle to cushion shackle movement.

4. In a motor vehicle, a load-supporting spring, a swinging shackle for the spring, an attachment bracket for said shackle, having integral therewith an extension provided with an opening therethru of increasing diameter toward both ends from midway thereof, to provide co-axial frusto-conical seats in opposite sides of the extension, a frusto-conical bushing of rubber in each seat, and a part associated with both bushings and operatively connected with the shackle to transmit shackle movement to the bushings for the damping thereof.

In testimony whereof I affix my signature.

JAMES DYKSTRA.